United States Patent Office 2,735,950
Patented Feb. 21, 1956

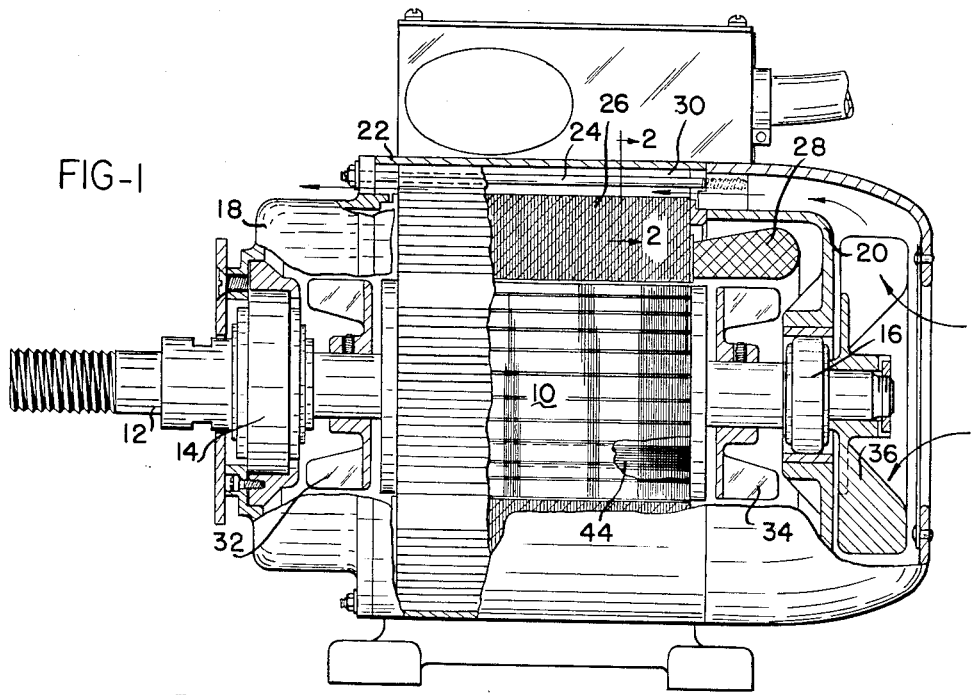
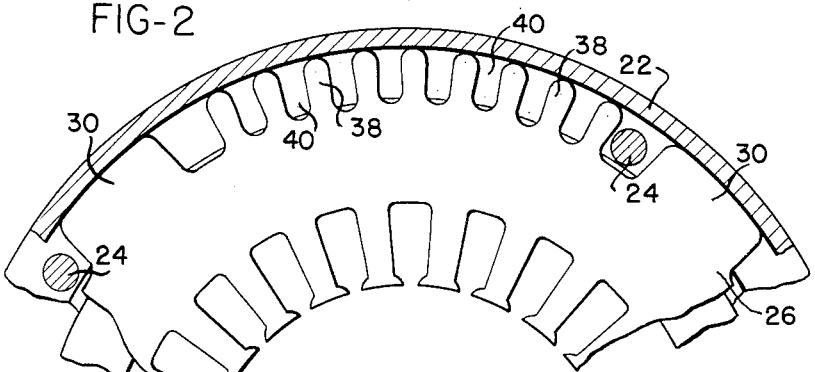
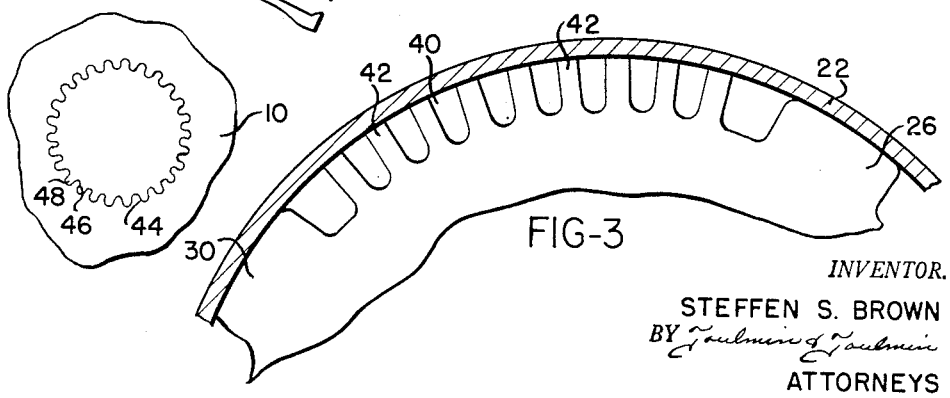
INVENTOR.
STEFFEN S. BROWN
BY Toulmin & Toulmin
ATTORNEYS

2,735,950

ELECTRIC MOTOR AND METHOD OF COOLING

Steffen S. Brown, Dayton, Ohio, assignor to The Brown-Brockmeyer Company, Dayton, Ohio, a corporation of Ohio Application October 24, 1952, Serial No. 316,713

2 Claims. (Cl. 310—57)

This invention relates to electric motors and like pieces of rotating electrical machinery, and in particular relates to an improved construction of an electrical motor for enhancing the cooling action of the air passed therethrough and to a method of improving the cooling qualities of electrical machinery of the nature referred to.

In connection with electrical motors, generators and the like, particularly those which operate on alternating current, it is important that the temperature rise of the motor be limited to a predetermined maximum amount in order to prevent destruction of the insulation covering the wires or deterioration thereof, and to maintain the motor within reasonable temperature limits at all times.

In the case of the ordinary electrical motor or generator, it is readily possible to circulate air completely through the motor and in, more or less, intimate contact with the rotor or stator and the windings thereof for extracting heat therefrom and carrying it away.

In the case of an enclosed motor, such as dust- or vapor-proof motors, it is not possible to circulate air completely through the motor frame, and instead means are provided for circulating the air about within the frame of the motor and by means of which heat is extracted from the rotor and stator and is dissipated out through the frame of the motor by being conveyed thereto by the circulating air.

In either case referred to above the efficiency of cooling will depend largely on the efficiency with which the heat is delivered from the stator or rotor to the circulating air, and it is, therefore, important for the air to be blown directly on these parts and for there to be ample area for the air to contact so that the heat can be extracted from the parts.

The tendency in recent years has been toward smaller and smaller motors and the like, due to improved insulation and higher permeability steels for forming laminations, and the problem of proper cooling of electrical machinery is thus increased in complexity.

Having the foregoing in mind, the primary object of the present invention is to provide an improved method of effecting the cooling of electrical machinery, particularly electric motors and especially the stators thereof.

Another object of this invention is the provision of improved construction of electric motors and the like, in which a greatly increased heat dissipating area is provided for extraction of heat from the machinery.

A still further object of this invention is the provision of a method for cooling electrical motors and the like, and a construction leading to improved cooling qualities which does not, in any way, interfere with the electrical characteristics of the said motor or the like.

A still further object is the provision of a cooling method and a means for effecting the cooling of an electric motor which is inexpensive to provide, and which will be trouble-free during the life of the motor with which it is employed.

The objects referred to above, as well as still other objects and advantages of this invention, will become more apparent upon reference to the following specification taken in connection with the accompanying drawings, in which:

Figure 1 is a vertical longitudinal section through an electric motor provided with cooling means, according to my invention;

Figure 2 is a fragmentary vertical section indicated at line 2—2 on Figure 1, drawn at greatly increased scale and showing more in detail the cooling means of my invention;

Figure 3 is a fragmentary view similar to Figure 2, showing a somewhat different form which the fingers provided on the stator lamination can take; and Figure 4 is a fragmentary view illustrating how the rotor lamination can be formed to provide for an increased area for heat dissipation about the bores extending therethrough.

Referring to the drawings somewhat more in detail, the electric motor in Figure 1 comprises a rotor 10 on a shaft 12 which is journalled in the bearings 14 and 16 located in end frame members 18 and 20 which abut opposite ends of an outer frame 22 to be held in position thereon by the through bolts 24.

Rotor 10 cooperates magnetically with stator 26 that may be pressed within frame 22, and which is provided with windings 28.

Turning now to Figure 2, it will be seen that the stator 26, and which is made of a plurality of thin laminations according to practices well known in the electrical art, is provided with angularly spaced projections 30 adapted for being closely received within the frame member 22. In the usual type of construction, the space between the projections 30 is left open to provide for the passage of air about the stator and likewise provides a space through which the through bolts 24 will extend.

According to the present invention, the said space between the projections 30 is availed of for providing greatly increased surface for giving up heat to the air that is passed through or is circulated about within the motor frame as by one or more fan means, such as are indicated at 32, 34 and 36 in Figure 1 by the addition in the said space of a plurality of fingers or projections 38. The fingers or projections 38 are formed about the periphery of the stator laminations at the time they are blanked out, and may advantageously project outwardly so as to engage the inner surface of frame member 22 to provide additional support for the stator within the frame member and at the same time permitting the use of a somewhat thinner frame member than would otherwise be employed.

The slots or grooves 40 that are formed between the projections 38 form channels through which the air being circulated within the motor frame will pass and there will be several times as much area available for the air to extract heat from the motor as is provided in conventional constructions.

The said projections are illustrated in Figure 2 as having rounded ends, but also may be formed substantially flat on the ends as illustrated at 42 in Figure 3, and substantially the same increase in area for contacting the cooling air obtains in the Figure 3 construction as in the Figure 2 construction. In addition, the Figure 3 arrangement provides for an increased conduction of heat to the outer frame member for dissipation to the surrounding atmosphere.

In the fragmentary Figure 4 illustration there is shown one of the bores or passages 44 that are provided in a rotor such as a squirrel cage rotor for the passage of air therethrough to cool the rotor, and which likewise serves to lighten the rotor by removing iron therefrom at a location where the magnetic field is quite weak.

According to the principle of this invention, these bores or channels 44 may be provided with a serrated or irregular inner surface formed by the projections 46 alternating with the grooves 48, and whereby a greatly increased cooling area is provided.

From the foregoing it will be seen that the present invention attains the objects set out above by the relatively simple expedient of making the surface of a stator or rotor where the cooling air passes thereover irregular, while at the same time providing smooth surfaced channels for the passage of air, thus greatly increasing the heat dissipating area while at the same time the air can readily and quickly pass through the said channels because they are not rough and present a substantial cross section.

It will be evident that this invention can be employed in connection with the usual ventilating type motor or with enclosed motors, either of the dust-tight or vapor-proof types. No added expense is incurred in constructing the electrical machinery according to this invention, and there is no change in the electrical or magnetic characteristics thereof.

It will be understood that this invention is susceptible to modification in order to adapt it to different usages and conditions, and, accordingly, it is desired to comprehend such modifications within this invention as may fall within the scope of the appended claims.

I claim:

1. In a dynamoelectric machine, a tubular frame member, end frame members having upstanding portions abutting opposite ends of said tubular member, said end frame members being of smaller diameter than said tubular member, a stator made up of aligned and similarly shaped stacked laminations between said end frame members and within said tubular frame member, said stator comprising radially extending angularly spaced projections running from end to end thereof engaging the tubular frame member to support the stator therein and to define channels for cooling air along the stator and the tubular frame member, a plurality of angularly spaced axially extending projections on said stator in said channels for increasing the effective heat dissipating area of the stator, said projections being less in width than said supporting projections and extending outwardly into engagement with the inner surface of the tubular frame member whereby each of said channels is subdivided into a plurality of passages, the bottom of each said passage being substantially even with the outer diameters of said end frame members, a plurality of through bolts extending through certain of said passages and interconnecting the upstanding portions of said end frame members, an outer end casing member extending from one end of said tubular frame member and over one of said end frame members, an opening in the end of said end casing member, and means between said end casing member and said end frame member for driving air over said end frame members and through said passages.

2. In a dynamoelectric machine as claimed in claim 1, with certain of said passages comprising spaced openings in the stator for extending said bolts therethrough.

References Cited in the file of this patent

UNITED STATES PATENTS

| | | |
|---|---|---|
| 1,449,577 | Bergstrom | Mar. 27, 1923 |
| 1,794,029 | Pfleger | Feb. 24, 1931 |
| 1,870,237 | Chervenka | Aug. 9, 1932 |
| 2,515,973 | Abbott | July 18, 1950 |
| 2,610,992 | Johns | Sept. 16, 1952 |

FOREIGN PATENTS

| | | |
|---|---|---|
| 61,750 | Austria | Oct. 25, 1913 |
| 255,981 | Great Britain | Aug. 5, 1926 |
| 453,038 | Great Britain | Sept. 3, 1936 |
| 627,446 | Great Britain | Aug. 9, 1949 |